United States Patent
Edberg

(10) Patent No.: US 11,746,807 B2
(45) Date of Patent: Sep. 5, 2023

(54) RELEASABLE FASTENING DEVICE AND A METHOD FOR OPERATING A RELEASABLE FASTENING DEVICE

(71) Applicants: Ningbo Geely Automobile Research & Development Co., Ltd., Ningbo (CN); Zhejiang Geely Holding Group Co., Ltd., Zhejiang (CN)

(72) Inventor: Martin Edberg, Gothenburg (SE)

(73) Assignee: NINGBO GEELY AUTOMOBILE RESEARCH & DEVELOPMENT CO., Ningbo (CN)

( * ) Notice: Subject to any disclaimer, the term of this patent is extended or adjusted under 35 U.S.C. 154(b) by 0 days.

(21) Appl. No.: 17/752,374

(22) Filed: May 24, 2022

(65) Prior Publication Data

US 2022/0282745 A1    Sep. 8, 2022

Related U.S. Application Data

(63) Continuation of application No. PCT/CN2020/129084, filed on Nov. 16, 2020.

(30) Foreign Application Priority Data

Dec. 13, 2019 (EP) .................... 19216010

(51) Int. Cl.
F16B 2/20 (2006.01)
F16B 21/06 (2006.01)

(52) U.S. Cl.
CPC ............... *F16B 2/20* (2013.01); *F16B 21/06* (2013.01)

(58) Field of Classification Search
CPC .... F16B 2/20; F16B 21/06; F16B 2/04; F16B 2/18; F16B 13/0833; Y10T 24/44026
See application file for complete search history.

(56) References Cited

U.S. PATENT DOCUMENTS 3,875,843 A    4/1975 Maeda et al.
4,850,773 A *  7/1989 Asami .................... F16B 21/06
                                                      411/908

(Continued)

FOREIGN PATENT DOCUMENTS

CN   102267126 A   12/2011
CN   104368962 A    2/2015

(Continued)

OTHER PUBLICATIONS

International Search Report from corresponding International Application No. PCT/CN2020/129084, dated Feb. 22, 2021, 2 pages.

*Primary Examiner* — Robert Sandy
(74) *Attorney, Agent, or Firm* — TUCKER ELLIS LLP

(57) ABSTRACT

A releasable fastening device includes a socket, an engagement structure, and first and second lever arms. The socket is insertable into an opening of an object from a first side. The first and second lever arms are pivotably attached to the socket at respective pivot points and are slidably connected to the engagement structure. The fastening device moves between a mounting position where the fastening device is insertable into the object and a fastening position where the fastening device is attached thereto. The first and second lever arms have respective attachment surfaces, respectfully configured to engage a first engagement surface on a second side of the object in connection to the opening in the fastening position and a second engagement surface on the second side of the object in connection to the opening in the fastening position.

16 Claims, 3 Drawing Sheets

(56) References Cited

U.S. PATENT DOCUMENTS

| | | | |
|---|---|---|---|
| 4,890,966 A * | 1/1990 | Umezawa | F16B 19/1081 |
| | | | 411/908 |
| 5,417,531 A | 5/1995 | Brown | |
| 5,775,861 A | 7/1998 | Leon | |
| 7,143,485 B2 * | 12/2006 | Kanie | F16B 37/0842 |
| | | | 24/297 |
| 8,424,173 B2 | 4/2013 | Shiba | |
| 9,220,349 B1 * | 12/2015 | Cashin | F16B 2/04 |
| 2010/0119325 A1 | 5/2010 | Edland | |

FOREIGN PATENT DOCUMENTS

| | | |
|---|---|---|
| CN | 107309828 A | 11/2017 |
| CN | 206967406 U | 2/2018 |
| CN | 208483767 U | 2/2019 |
| DE | 102007012889 A1 | 12/2007 |
| DE | 102017211448 A1 | 1/2019 |
| DE | 202019102825 U1 | 6/2019 |
| EP | 2166235 A2 | 3/2010 |
| WO | 2019081612 A1 | 2/2019 |

* cited by examiner

RELEASABLE FASTENING DEVICE AND A METHOD FOR OPERATING A RELEASABLE FASTENING DEVICE

RELATED APPLICATION DATA

This application is a continuation of International Patent Application No. PCT/CN2020/129084, filed Nov. 16, 2020, which claims the benefit of European Patent Application No. 19216010.9, filed Dec. 13, 2019, the disclosures of which are incorporated herein by reference in their entireties.

TECHNICAL FIELD

The present disclosure relates to a releasable fastening device, comprising a socket, an engagement structure, a first lever arm, and a second lever arm. The socket is configured for being inserted into an opening of an object from a first side of the object. The fastening device is configured for being movable between a mounting position in which the fastening device is insertable into the object and a fastening position in which the fastening device is attached to the object. The disclosure further relates to a method for operating a releasable fastening device.

BACKGROUND

Fastening devices of different types are commonly used for attaching a variety of objects in different kind of applications. In the automotive industry, fastening devices are used for holding objects attached to vehicle structures or other objects, and often screws, rivets or clips are used. The use of fastening devices is a time consuming part of the vehicle manufacturing operation and during the design of a vehicle there is a desire to make the use of fastening devices as efficient, fail-safe, cost-effective, and easy as possible.

When for example using screws in vehicle assembly operations the tightening torques many times need to be controlled in order to know that the screw is tightened appropriately to hold for the desired application. This control is time consuming and may lead to an incorrect operational step if the torque is measured incorrectly. The actual axial force that the screw exerts when being tightened depends on many parameters such as for example friction, speed, and elasticity, which could be difficult to predict in a good way. When using screws there are further needs for the preparation of threads or the fastening of weld-nuts. Mis-threading of the screws may be a potential problem during the assembly process. When operators are assembling vehicles in the automotive industry, the vehicle assembly time is a crucial factor. There are fastening devices that can be fastened quickly, such as for example smaller plastic clips that mainly are used for fastening other plastic items such as trim panels, covers, or other vehicle parts. Often, the plastic clips used are weak in construction and difficult to re-use if disassembled. In many cases, there is a wish to remove the fastening device if needed without destroying it, and therefore single-use clips or rivets are having a limited use and are not suitable for such applications.

There is thus a need for an improved releasable fastening device and method for operating the releasable fastening device.

SUMMARY

An object of the present disclosure is to provide a releasable fastening device and a method for operating a releasable fastening device where the previously mentioned problems are avoided. This object is at least partly achieved by the features of the independent claims. The dependent claims contain further developments of the releasable fastening device.

The disclosure concerns a releasable fastening device, comprising a socket, an engagement structure, a first lever arm, and a second lever arm. The socket is configured for being inserted into an opening of an object from a first side of the object. The first lever arm is pivotably attached to the socket in a first pivot point, and the second lever arm is pivotably attached to the socket in a second pivot point. The first lever arm is slidably connected to the engagement structure and the second lever arm is slidably connected to the engagement structure. The fastening device is configured for being movable between a mounting position in which the fastening device is insertable into the object and a fastening position in which the fastening device is attached to the object. The first lever arm comprises a first attachment surface and the second lever arm comprises a second attachment surface, where the first attachment surface is configured for engaging a first engagement surface arranged on a second side of the object in connection to the opening in the fastening position and the second attachment surface is configured for engaging a second engagement surface arranged on the second side of the object in connection to the opening in the fastening position.

Advantages with these features are that the fastening device can be made with a robust and flexible construction through the configuration with the lever arms. There is no need to use an extra tool and/or apply a tightening torque when using the fastening device in a vehicle assembly process and the fastening operation can be made fast, efficient, and through the construction and function, the risk for vehicle manufacturing errors is minimized. The fastening device is through the releasable configuration possible for being re-used if disassembled. The fastening device may be removed if needed without being destroyed, and a suitable tool may be used for removing the fastening device.

According to an aspect of the disclosure, the fastening device comprises a first axle connected to the socket and the first lever arm, and a second axle connected to the socket and the second lever arm. The first lever arm is pivotably arranged around the first axle in the first pivot point, and the second lever arm is pivotably arranged around the second axle in the second pivot point. The axles are providing an efficient pivoting function of the lever arms around the respective pivot points for a flexible use of the releasable fastening device.

According to another aspect of the disclosure, the first lever arm comprises a first arm section extending between the first pivot point and a first arm end, where the first arm end is slidably connected to the engagement structure. The second lever arm comprises a second arm section extending between the second pivot point and a second arm end, where the second arm end is slidably connected to the engagement structure. The slidably connections of the arm ends to the engagement structure are establishing a simple and flexible solution, where the lever arms through the connections are movably arranged to the engagement structure for an efficient opening and closing of the fastening device.

According to an aspect of the disclosure, the first lever arm comprises a third arm section extending between the first pivot point and a third arm end, where the first attachment surface is arranged in connection to the third arm end. The second lever arm comprises a fourth arm section extending between the second pivot point and a fourth arm end, where the second attachment surface is arranged in connection to the fourth arm end. The arrangement of the attachment surfaces on the respective arm sections in connection to the arm ends is establishing pivoting functions with levering effects, where the holding force of the fastening device can be designed to suit a specific application purpose.

According to another aspect of the disclosure, the first arm section and the third arm section are extending in different directions from the first pivot point. The second arm section and the fourth arm section are extending in different directions from the second pivot point. The extensions in different directions are providing a compact fastening device construction where the lever arms are movably arranged in relation to each other for an efficient fastening operation.

According to an aspect of the disclosure, the first arm section and the second arm section are configured to be positioned in an X-like configuration in relation to each other in the fastening position. The X-like configuration is further contributing to the compact and efficient design of the fastening device, where the lever arms efficiently are used for the fastening operation.

According to another aspect of the disclosure, the socket comprises a support structure with a support surface, where the support surface is configured for engaging the first side of the object. The support surface may be made with a robust construction for holding the fastening device in tight connection to the object. The support surface may further be shaped to correspond to the shape of the object.

According to a further aspect of the disclosure, the socket comprises an extension structure, where the extension structure is configured for protruding into the opening of the object. The extension structure is providing a stable construction of the socket and may have a shape corresponding to the shape of the opening for an efficient fastening functionality of the fastening device. The extension surface is arranged for extending through the opening and is establishing a suitable position for the lever arms in relation to the object.

According to an aspect of the disclosure, the engagement structure comprises one or more slots. The first arm end and the second arm end are slidingly connected to the one or more slots. The slots are holding the lever arms in connection to the engagement structure. The slots are used for slidingly engaging the lever arms in relation to the engagement structure.

According to another aspect of the disclosure, the fastening device comprises a locking device configured for releasably locking the engagement structure to the socket in the fastening position. The locking device is providing a secure connection between the socket and the engagement structure in the fastening position. The locking device is securing that the fastening device cannot be accidentally disconnected when arranged in the fastening position.

According to a further aspect of the disclosure, the locking device comprises one or more locking slots arranged in the engagement structure and one or more locking pins arranged in the socket. Each locking pin is configured for being in locking engagement with a corresponding locking slot in the fastening position.

According to an aspect of the disclosure, the locking device comprises one or more locking channels arranged in the socket. Each locking pin is slidably connected to a corresponding locking channel. The sliding connection is establishing an efficient locking function.

According to another aspect of the disclosure, the locking device comprises one or more springs. Each locking pin is slidably connected to the corresponding locking channel via a corresponding spring. The one or more springs are providing a simple and secure solution for a sliding functionality of each of the locking pins in relation to the corresponding locking channels. The one or more springs may be used for a snap action of the locking pins in relation to the locking slots of the engagement structure.

According to a further aspect of the disclosure, the engagement structure is configured for moving in a direction towards the socket when the fastening device is displaced from the mounting position to the fastening position. The engagement structure is configured for moving in a direction away from the socket when the fastening device is displaced from the fastening position to the mounting position. The first lever arm is configured for pivoting around the first pivot point when the fastening device is being displaced between the mounting position and the fastening position, and the second lever arm is configured for pivoting around the second pivot point when the fastening device is being displaced between the mounting position and the fastening position.

According to an aspect of the disclosure, the engagement structure is arranged as a hood, and the engagement structure is configured for at least partly encompassing the socket in the fastening position. The hood configuration is used for encompassing the socket for a compact, secure, and efficient design of the fastening device.

The disclosure further concerns a method for operating a releasable fastening device, where the fastening device comprises a socket, an engagement structure, a first lever arm, and a second lever arm. The first lever arm is pivotably attached to the socket in a first pivot point and the second lever arm is pivotably attached to the socket in a second pivot point. The first lever arm is slidably connected to the engagement structure and the second lever arm is slidably connected to the engagement structure. The first lever arm comprises a first attachment surface and the second lever arm comprises a second attachment surface. The fastening device is movable between a mounting position in which the fastening device is insertable to an opening of an object and a fastening position in which the fastening device is attached to the object. The method comprises the steps: inserting the socket into the opening from a first side of the object when the fastening device is arranged in the mounting position, displacing the fastening device from the mounting position to the fastening position, and during movement of the fastening device from the mounting position to the fastening position engaging a first engagement surface arranged on a second side of the object in connection to the opening with the first attachment surface and engaging a second engagement surface arranged on the second side of the object in connection to the opening with the second attachment surface; or the method comprises the steps: displacing the fastening device from the fastening position to the mounting position, where in the fastening position the first attachment surface is engaging a first engagement surface arranged on a second side of the object in connection to the opening and the second attachment surface is engaging a second engagement surface arranged on the second side of the object in connection to the opening, during movement of the fastening device from the fastening position to the mounting position disengaging the first attachment surface from the first engagement surface and disengaging the second attachment surface from the second engagement surface, and removing the socket from the opening from a first side of the object when the fastening device is arranged in the mounting position or when the fastening device is being displaced towards the mounting position.

Advantages with these features are that the method is providing a robust and flexible connection through the configuration with the lever arms. There is no need to use an extra tool and/or apply a tightening torque when using the fastening device and the fastening operation can be made fast, efficient, and is minimizing the risk for vehicle manufacturing errors. However, the design can be made so that an extra tool is needed for disengaging the fastening device if desired. The fastening device is through the method suitable for being re-used if disassembled. The fastening device may be removed if needed without being destroyed or damaged.

BRIEF DESCRIPTION OF THE DRAWINGS

The disclosure will be described in detail in the following, with reference to the attached drawings, in which.

DETAILED DESCRIPTION

Various aspects of the disclosure will hereinafter be described in conjunction with the appended drawings to illustrate and not to limit the disclosure, wherein like designations denote like elements, and variations of the described aspects are not restricted to the specifically shown embodiments, but are applicable on other variations of the disclosure.

Figure 1:
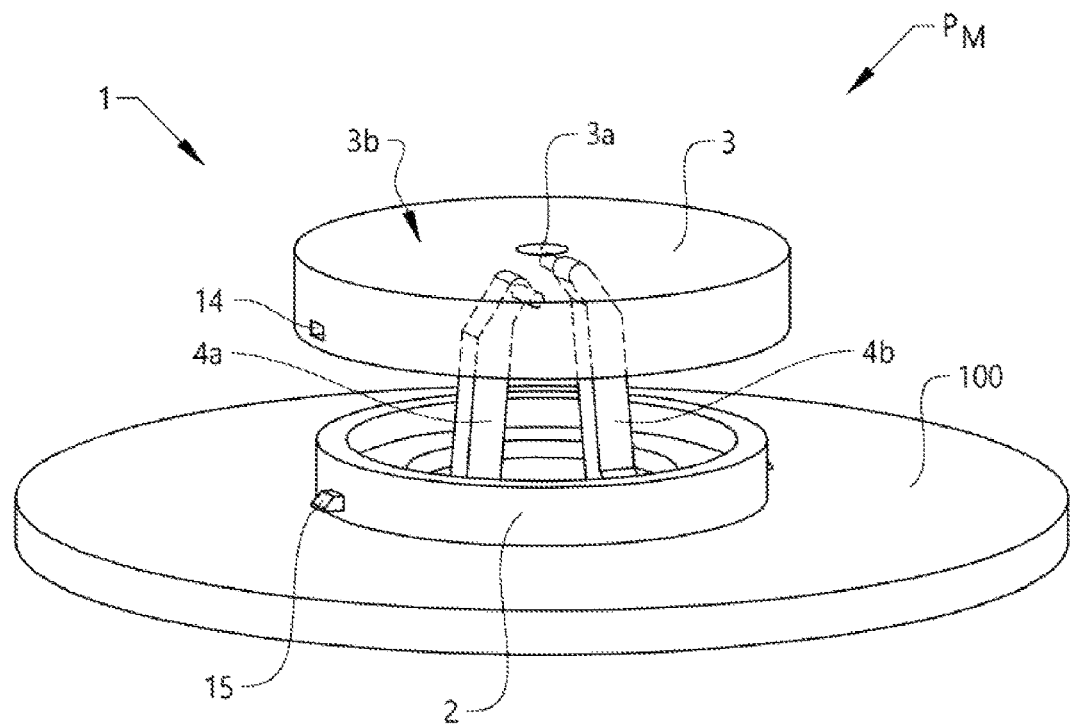
FIG. 1 shows schematically, in a perspective view a releasable fastening device in a mounting position according to the disclosure.
Figure 2:
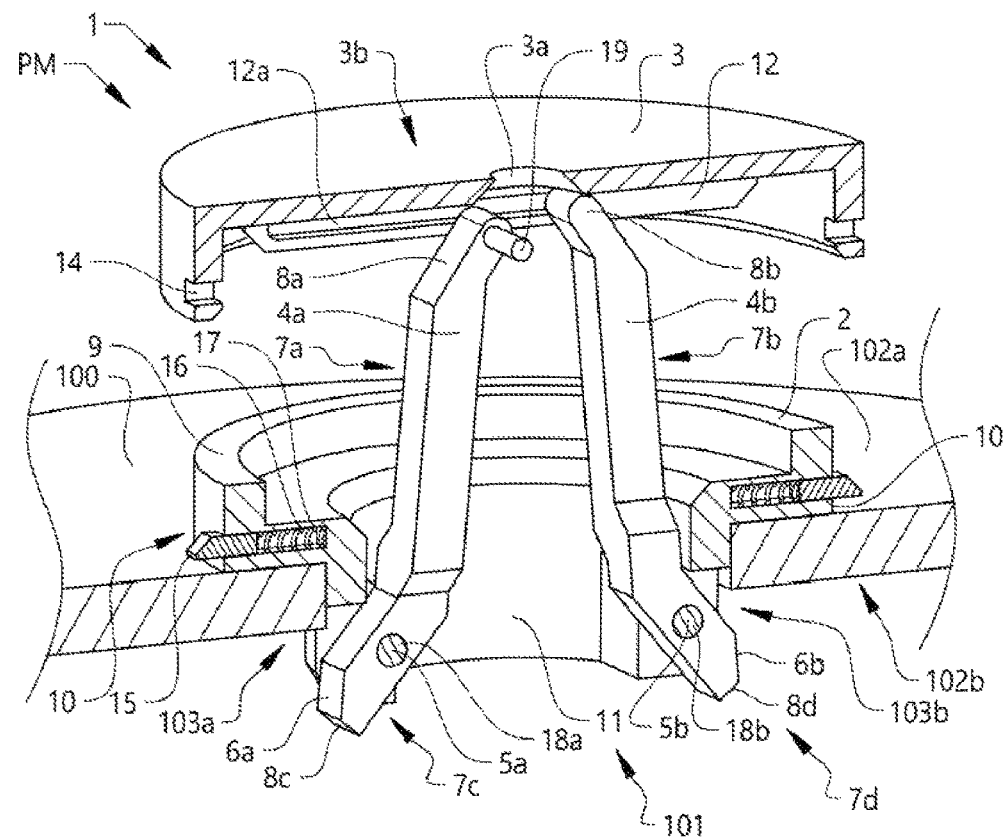
FIG. 2 shows schematically, in a perspective cross-sectional side view the releasable fastening device in a mounting position according to the disclosure.
Figure 3:
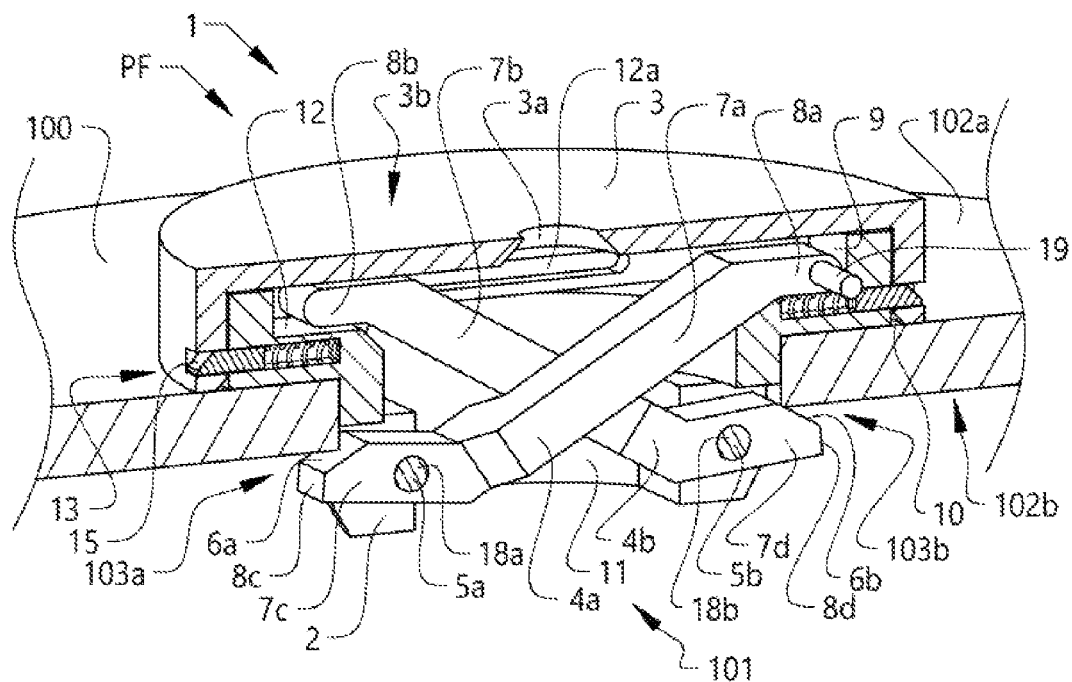
FIG. 3 shows schematically, in a perspective cross-sectional side view the releasable fastening device in a fastening position according to the disclosure.

FIGS. 1-6 schematically show a releasable fastening device 1 according to the disclosure. In FIGS. 1 and 2, the fastening device 1 is positioned in a mounting position $P_M$, where the fastening device 1 is insertable into an opening 101 of an object 100. The object 100 may as illustrated be a vehicle structure having a sheet-like configuration of for example steel, aluminium, or composite materials, to which the fastening device 1 is attached. The fastening device 1 may be arranged to attach or hold two or more sheet-like structures in close connection to each other, and the object 100 is then constituted by the two or more sheet-like structures having corresponding openings for the insertion of the fastening device 1. The fastening device 1 may further be arranged to connect other vehicle parts, such as for example trim panels or covers to the object 100, where the object 100 may be constituted by one or more sheet-like structures. In any case, one or more fastening devices 1 may be used together to fulfill the desired purpose. It should be understood that the object 100 is not limited to sheet-like structures, and any type of structure with a suitable opening 101 may constitute the object 100. In FIG. 3, the fastening device 1 is illustrated in a fastening position $P_F$, where the fastening device is securely attached to the object 100.

The releasable fastening device 1 comprises a socket 2, an engagement structure 3, a first lever arm 4a, and a second lever arm 4b, as illustrated in FIGS. 1-6. The socket 2 is the constructional part of the fastening device that is configured for being inserted into the opening 101 of the object 100 from a first side 102a of the object 100. In the embodiment illustrated in FIGS. 2 and 3, the first side 102a may be referred to as an upper side of the object 100. The fastening device 1, in the position shown in FIGS. 2 and 3, has thus been inserted into the opening 101 from above in a direction downwards, and the socket 2 is in the illustrated position inserted into the opening 101. The socket 2 and the engagement structure 3 may have any suitable shape, and the shape of the socket 2 may correspond to the shape of the opening 101 if suitable.

The socket 2 in the illustrated embodiment comprises a support structure 9 with a support surface 10, where the support surface 10 is configured for engaging and being in contact with the first side 102a of the object 100. In the embodiment illustrated in FIGS. 2 and 3, the support structure 9 is arranged on the upper side of the object 100 and the support surface 10 is in contact with the first side 102a of the object 100. The support surface 10 is arranged as a lower surface of the support structure 9, which is in contact with the first side 102a. The socket 2 further comprises an extension structure 11, and the extension structure 11 is configured for protruding into the opening 101 of the object 100, as shown in FIGS. 2 and 3. The extension structure 11 in the embodiment illustrated in FIGS. 2 and 3 is the part of the socket 2 that at least partly is configured for being inserted into the opening 101, and in the position shown in the figures is protruding from the support structure 9 in a direction downwards through and below the opening 101. The support structure 9 and the extension structure 11 may be constituted as integrated parts of the socket 2. The socket 2 may be made of any suitable material, such as steel, aluminium, or other suitable metals. The socket 2 may also be made of plastic or composite materials if suitable, or of a combination of different materials. The extension structure 11 may suitably have a shape corresponding to the shape of the opening 101.

The first lever arm 4a is pivotably attached to the socket 2 in a first pivot point 5a and the second lever arm 4b is pivotably attached to the socket 2 in a second pivot point 5b. The first lever arm 4a is arranged to pivot in relation to the socket 2 in the first pivot point 5a, and as illustrated in the figures, the first pivot point 5a is arranged on the extension structure 11 of the socket 2. The second lever arm 4b is arranged to pivot in relation to the socket 2 in the second pivot point 5b, and as illustrated in the figures, the second pivot point 5b is arranged on the extension structure 11 of the socket 2. The lever arms may be made of any suitable material, such as steel, aluminium, or other suitable metals. The lever arms may also be made of plastic or composite materials if suitable, or of a combination of different materials. It should be understood that the shapes of the lever arms may differ from the ones shown in the illustrated embodiment.

As shown in the figures, the first pivot point 5a may be arranged as a first axle 18a connected to the socket 2 and the first lever arm 4a, and the first lever arm 4a is pivotably arranged around the first axle 18a in the first pivot point 5a. The second pivot point may be arranged as a second axle 18b connected to the socket 2 and the second lever arm 4b, and the second lever arm 4b is pivotably arranged around the second axle 18b in the second pivot point 5b. The first axle 18a and the second axle 18b may be arranged as separate structural elements that are attached to the socket 2 and the respective lever arms, allowing the lever arms to rotate around the corresponding axles. The axles may be made of any suitable material, such as plastic materials, steel, aluminium or other suitable metals, or composite materials. In alternative embodiments, the axles may be arranged as integrated parts of the socket 2, or as integrated parts of the lever arms, allowing the lever arms to rotate in the pivot points in relation to the socket 2. As shown in the embodiment in FIGS. 2 and 3, the first axle 18a and the second axle 18b are arranged in the lower part of the extension structure 11 of the socket 2.

Figure 4:
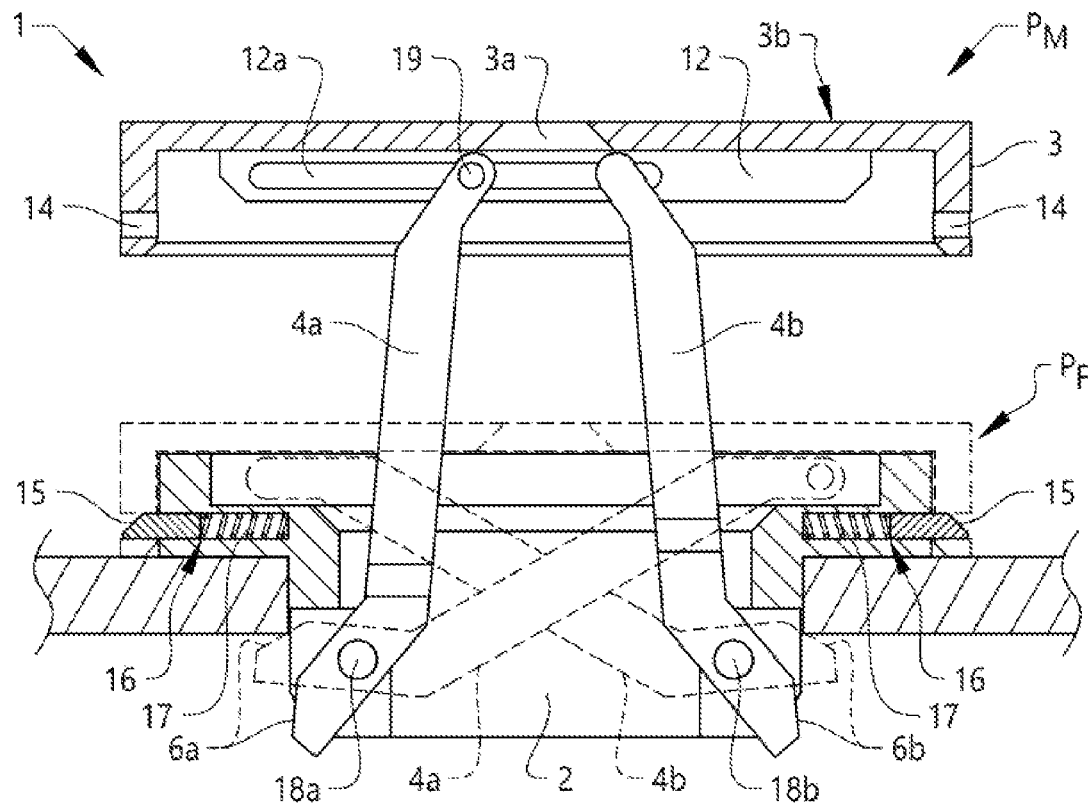
FIG. 4 shows schematically, in a cross-sectional side view the releasable fastening device in the mounting position and in the fastening position according to the disclosure.
Figure 5:
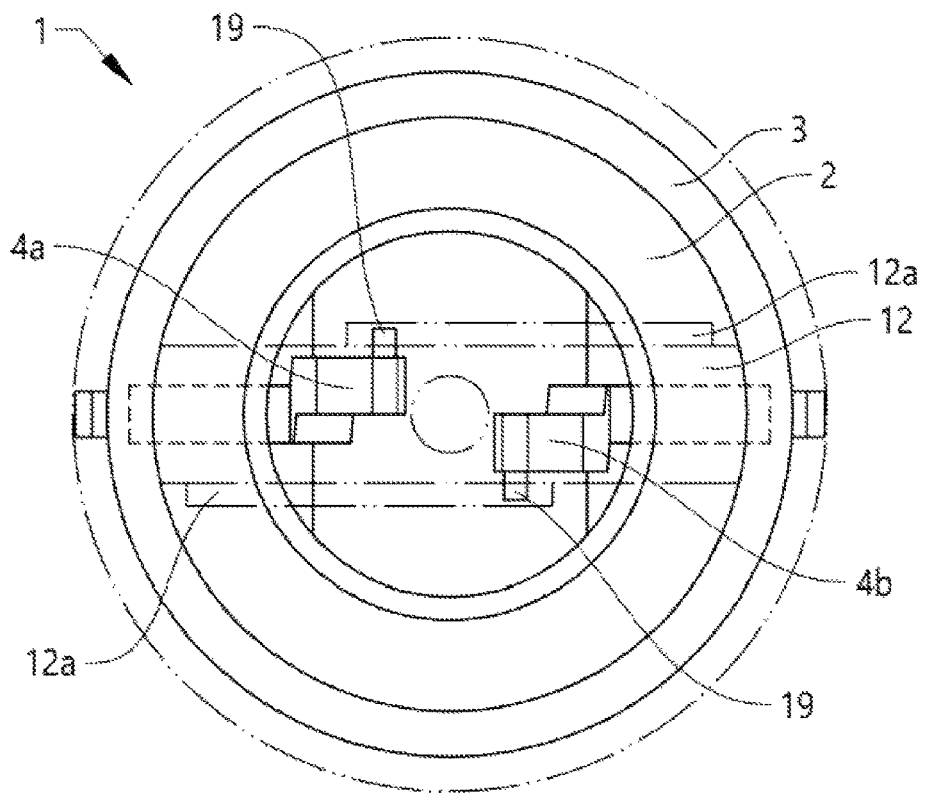
FIG. 5 shows schematically, in a view from below the releasable fastening device according to the disclosure.
Figure 6:
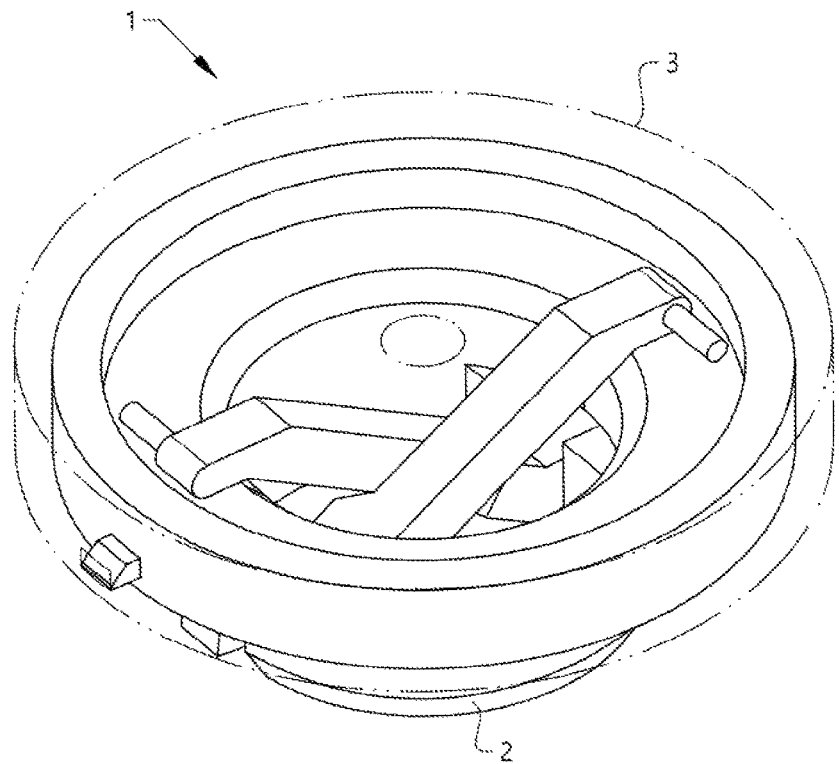
FIG. 6 shows schematically, in a perspective side view from above the releasable fastening device in the fastening position according to the disclosure.

The engagement structure 3 is arranged as a structure that is cooperating with the first lever arm 4a and the second lever arm 4b for closing and opening the fastening device 1. The engagement structure 3 may have any suitable shape, and in the illustrated embodiment, the engagement structure 3 is arranged as a hood, where the hood is configured for, at least partly, encompassing the socket 2 in the fastening position $P_F$, as schematically shown in FIGS. 3, 4 and 6. The engagement structure 3 may be made of any suitable material, such as steel, aluminium, or other suitable metals. The engagement structure 3 may also be made of plastic or composite materials if suitable, or of a combination of different materials. The engagement structure 3 may be provided with a hole 3a or similar structure for connecting other vehicle parts, such as for example trim panels or covers, to the fastening device 1. The hole 3a may be accessible from below the engagement structure 3 in the mounting position $P_M$ as illustrated in FIGS. 1 and 2, and the other vehicle parts may be attached to the engagement structure 3 with screws or other fastening means through the hole 3a. The other vehicle part may then be arranged in connection to an outer side 3b of the engagement structure 3 and the screw or other fastening means may be inserted through the hole 3a from below the engagement structure 3 in the mounting position $P_M$ illustrated in FIG. 1, and being screwed into or attached to the vehicle part for a secure engagement between the vehicle part and the engagement structure 3. The fastening device 1 can thereafter be quickly inserted into the object 100 for a fast assembling process.

The first lever arm 4a is slidably connected to the engagement structure 3, and the second lever arm 4b is slidably connected to the engagement structure 3. The sliding connections between the lever arms and the engagement structure 3 are used for pivoting the lever arms around the respective pivot points when closing and opening the fastening device 1, i.e. moving the engagement structure 3 upwards or downwards between the positions illustrated in the embodiment of the fastening device 1 shown in FIGS. 2 and 3, as will be further described below. As described above, the fastening device 1 is configured for being movable between the mounting position $P_M$ in which the fastening device 1 is insertable into the object 100 and the fastening position $P_F$ in which the fastening device is attached to the object 100. When the fastening device 1 has been inserted into the opening 101, the fastening device 1 can be closed by displacing the fastening device 1 from the mounting position $P_M$ to the fastening position $P_F$. If desired, the fastening device 1 can be opened by displacing the fastening device 1 from the fastening position $P_F$ back to the mounting position $P_M$ where the fastening device 1 can be removed from the opening 101.

The engagement structure 3 comprises one or more slots 12, and in the embodiment illustrated in the figures, the engagement structure comprises one common slot 12 for the lever arms. In the illustrated embodiment, a first arm end 8a of the first lever arm 4a and a second arm end 8b of the second lever arm 4b are slidingly connected to the slot 12. The first arm end 8a and the second arm end 8b are portions of the respective lever arms arranged in connection to and including an end tip of the lever arms. The one or more slots 12 may be configured as recesses for the respective lever arms, in which the respective arm ends are arranged to slide when opening or closing the fastening device 1. The arm ends may be arranged in a common slot as illustrated, or as an alternative each arm end in different slots. The connection between each arm end and its slot may be arranged with any suitable connection means, such as for example protrusions or sliding pins 19, as schematically illustrated in FIGS. 2 and 3, engaging one or more grooves 12a or tracks arranged in the slot 12. In the illustrated embodiment, the respective arm ends are each provided with a pin 19, and the slot 12 is provided with two grooves 12a for the respective pins 19 for a sliding engagement. The grooves 12a may have extensions along the slot 12 that is limiting the movements of the respective pins 19 if desired. The pins 19 and/or the grooves 12a may be provided with means for holding each pin 19 and the corresponding groove 12a in secure position in relation to each other during sliding movement.

The first lever arm 4a comprises a first attachment surface 6a and the second lever arm 4b comprises a second attachment surface 6b, as illustrated in FIGS. 2-4. The first attachment surface 6a is configured for engaging a first engagement surface 103a arranged on a second side 102b of the object 100 in connection to the opening 101 in the fastening position $P_F$. The second attachment surface 6b is configured for engaging a second engagement surface 103b arranged on the second side 102b of the object 100 in connection to the opening 101 in the fastening position $P_F$. The engagement surfaces of the second side 102b of the object may be any suitable surface and/or edge for engaging the attachment surfaces, such as for example a side surface of the opening 101, an edge of the opening 101, or a surface on the second side 102b of the object 100, such as the lower surface of the opening 101 in the illustrated embodiment. As further illustrated in FIGS. 2 and 3, the first attachment surface 6a and second attachment surface 6b may be slanted to efficiently engaging the respective first engagement surface 103a and second engagement surface 103b, for holding the fastening device 1 firmly in position in relation to the object 100, and also for handling different thicknesses and opening sizes of the object 100. Through the slanted or inclined configurations of the first attachment surface 6a and the second attachment surface 6b, the fastening device 1 can be used for objects 100 having different thicknesses and different sizes of the opening 101. Thus, depending on the designs of the first attachment surface 6a and the second attachment surface 6b, the fastening device 1 can be used for different objects 100 with varying opening sizes and object thicknesses within certain ranges.

As shown in the figures, the first lever arm 4a comprises a first arm section 7a extending between the first pivot point 5a and the first arm end 8a, where the first arm end 8a is slidably connected to the engagement structure 3. The second lever arm 4b comprises a second arm section 7b extending between the second pivot point 5b and the second arm end 8b, where the second arm end 8b is slidably connected to the engagement structure 3. The first lever arm 4a comprises a third arm section 7c extending between the first pivot point 5a and a third arm end 8c, and the first attachment surface 6a is arranged on the third arm section 7c in connection to the third arm end 8c. The second lever arm 4b comprises a fourth arm section 7d extending between the second pivot point 5b and a fourth arm end 8d, and the second attachment surface 6b is arranged on the fourth arm section 7d in connection to the fourth arm end 8d. The arrangement of the first attachment surface 6a on the third arm section 7c, and the arrangement of the second attachment surface 6b on the fourth arm section 7d, together with the first arm section 7a and the second arm section 7b, are establishing a pivoting function of the lever arms with a levering effect, where the holding force of the fastening device 1 can be designed to suit a specific application purpose. Through the levering effect, the fastening device 1 can be designed for specific pre-determined holding forces, through for example varying the length of the arm sections, based on the configuration of the opening 101 to which the fastening device is arranged to be attached. The size of the opening 101 and the thickness of the object 100 are examples of parameters that may be taken into consideration when designing the fastening device for a specific application and holding force.

The engagement structure 3 is configured for moving in a direction towards the socket 2 when the fastening device 1 is displaced from the mounting position $P_M$ to the fastening position $P_F$ during a closing operation. The engagement structure 3 is configured for moving in a direction away from the socket 2 when the fastening device 1 is displaced from the fastening position $P_F$ to the mounting position $P_M$ during an opening operation. The first lever arm 4a is configured for pivoting around the first pivot point 5a when the fastening device 1 is being displaced between the mounting position $P_M$ and the fastening position $P_F$. The second lever arm 4b is configured for pivoting around the second pivot point 5b when the fastening device 1 is being displaced between the mounting position $P_M$ and the fastening position $P_F$.

As illustrated in the figures, the first arm section 7a and the third arm section 7c are extending in different directions from the first pivot point 5a. The second arm section 7b and the fourth arm section 7d are extending in different directions from the second pivot point 5b. The extensions in different directions of the respective arm sections are providing a compact construction of the fastening device 1 for an efficient fastening operation. The first arm section 7a and the second arm section 7b are configured to be positioned in an X-like configuration in relation to each other in the fastening position $P_F$, as shown in FIG. 3. As understood from the configuration of the fastening device 1 from the figures, the first lever arm 4a and the second lever arm 4b are mounted in connection to each other 180 degrees apart or opposite each other, allowing the first arm section 7a and the second arm section 7b to be positioned in the X-like configuration. The X-like configuration is further contributing to the compact and efficient design of the fastening device 1, where the lever arms efficiently are used for the fastening operation.

The fastening device 1 further comprises a locking device 13 configured for releasably locking the engagement structure 3 to the socket 2 in the fastening position $P_F$, as illustrated in FIGS. 2 and 3. The locking device 13 is securing the engagement structure to the socket 2 for avoiding unwanted or accidental removal of the fastening device 1 from the object 100. The locking device 13 comprises one or more locking slots 14 arranged in the engagement structure 3 and one or more corresponding locking pins 15 arranged in the socket 2. The one or more locking slots 14 may be arranged as openings or recesses that are engaging the locking pins 15 in the fastening position $P_F$. Each locking pin 15 is configured for being in locking engagement with a corresponding locking slot 14 in the fastening position $P_F$. Further, as shown in FIGS. 2 and 3, the locking device 13 comprises one or more locking channels 16 arranged in the socket 2. Each locking pin 15 is slidably connected to a corresponding locking channel 16. The locking device 13 comprises one or more springs 17, where each locking pin 15 is slidably connected to the corresponding locking channel 16, and further attached to a corresponding spring 17. In the mounting position $P_M$, the locking pins 15 may partly extend out from their locking channels 16, as illustrated in FIG. 2. The one or more springs 17 may be used for a snap action between the locking pins 15 and the corresponding locking slots 14 of the engagement structure 3.

When locking the fastening device 1 with the locking device 13, the fastening device 1 is displaced from the mounting position $P_M$ to the fastening position $P_F$, and the locking pins 15 are first pushed into the locking channels 16 when meeting the lower part of engagement structure 3, as understood from FIGS. 2 and 3, and thereafter when aligned with the corresponding locking slots 14 the locking pins 15 are allowed to snap out into the locking slots, as illustrated in FIG. 3, for a secure engagement between the engagement structure 3 and the socket 2. To remove the fastening device 1 from the object 100, the locking pins 15 may be pushed into the respective locking channels 16 for releasing the locking pins 15 from the locking slots 14, and thus the engagement structure 3 from the socket 2. A suitable tool may be used for the releasing operation when pushing the locking pins into the respective locking channels, in order to prevent unwanted release operations. When the fastening device 1 is unlocked, the fastening device 1 can be displaced from the fastening position $P_F$ to the mounting position $P_M$.

The locking slots 14 may be configured to extend through the engagement structure 3, and the locking pins 15 may be arranged to be visible from outside the engagement structure 3 when engaging the locking slots 14, as schematically indicated in FIG. 3. This arrangement may provide a visible indication that the locking pins 15 are in locking engagement with the locking slots 14 for a secure locking of the engagement structure 3 to the socket 2.

To attach the releasable fastening device 1 to the object 100, the fastening device 1 is displaced from the mounting position $P_M$, in which the fastening device 1 is insertable to the opening 101 of the object 100, to the fastening position $P_F$, in which the fastening device 1 is attached to the object 100. When the fastening device 1 is arranged in the mounting position $P_M$, the socket 2 can be inserted into the opening 101 from the first side 102a of the object 100. When the socket 2 has been inserted into the opening 101, the fastening device 1 is moved from the mounting position $P_M$ to the fastening position $P_F$, by displacing the engagement structure 3 in a direction towards the socket 2. The displacement may for example be executed by an operator, who directly or indirectly through an attached part is pushing the engagement structure 3 towards the socket 2. During the displacement of the engagement structure 3 towards the socket 2, the first lever arm 4a and the second lever arm 4b are being displaced through pivoting movements from the mounting position $P_M$, illustrated in FIG. 2, to the fastening position $P_F$, illustrated in FIG. 3. During the displacements of the lever arms, they are sliding in relation to the slot 12 in the engagement structure 3 through the sliding connection of the first arm end 8a of the first lever arm 4a and the second arm end 8b of the second lever arm 4b. In the illustrated embodiment, the first arm end 8a and the second arm end 8b are sliding from the mounting position $P_M$ illustrated in FIG. 2, where the respective arm ends are arranged more towards a middle position of the engagement structure 3, to the fastening position $P_F$ illustrated in FIG. 3. In the fastening position $P_F$ shown in FIG. 3, the arm ends have been slidingly displaced towards the outer edge of the engagement structure 3, and through the sliding displacement of the lever arms in combination with the pivoting movement around the respective pivot points, the first arm section 7a and the second arm section 7b are arranged in the X-like configuration described above. During the movement of the fastening device 1 from the mounting position $P_M$ to the fastening position $P_F$, the first attachment surface 6a is engaging the first engagement surface 103a arranged on the second side 102b of the object 100 in connection to the opening 101, and the second attachment surface 6b is engaging the second engagement surface 103b arranged on the second side 102b of the object 100 in connection to the opening 101. As described above, the locking device 13 is further releasably locking the engagement structure 3 to the socket 2 during the displacement of the fastening device 1 from the mounting position $P_M$ to the fastening position $P_F$.

To remove the fastening device 1 from the object 100, the fastening device 1 is displaced from the fastening position $P_F$ in which the fastening device 1 is attached to the object 100 to the mounting position $P_M$ in which the fastening device 1 is removable from the opening 101 of the object 100. The locking device 13 is first released as described above, for example with a suitable tool, allowing the fastening device 1 to be moved from the fastening position $P_F$ to the mounting position $P_M$. In the fastening position $P_F$, the first attachment surface 6a is engaging the first engagement surface 103a arranged on the second side 102b of the object 100 in connection to the opening 101, and the second attachment surface 6b is engaging the second engagement surface 103b arranged on the second side 102b of the object 100 in connection to the opening 101. During movement of the fastening device from the fastening position $P_F$ to the mounting position $P_M$ the first attachment surface 6a is being disengaged from the first engagement surface 103a and the second attachment surface 6b is being disengaged from the second engagement surface 103b. When the respective attachment surfaces have been disengaged from their corresponding engagement surfaces, the socket 2 can be removed from the opening 101 from the first side 102a of the object 100 when the fastening device 1 is arranged in the mounting position $P_M$, or when being displaced towards the mounting position $P_M$. The fastening device 1 may thus be removed from the opening 101 when the first attachment surface 6a and the second attachment surface 6b are no longer engaging the object 100, or interfering with the opening 101.

The fastening device 1 may as described above be made in a robust material to have a holding capacity better than traditional plastic clips. The lever arms may be made of a slightly flexible material for taking up minor tolerances in thicknesses of the object 100, and for getting a constant pressure exerted on the object 100 in the fastening position $P_F$. In cases where the diameter of the opening 101 of the object 100 is not only slightly larger than the diameter of the socket 2, the lever arms will through the slanted attachment surfaces and the force vector direction coming from the lever arms cause the fastening device 1 to be self-centred when tightened in the fastening position $P_F$. Different parts of the fastening device 1 may be calculated and dimensioned in a suitable manner for acquiring the desired functionality and holding force. Further details, such as for example bearings may be added to the fastening device 1 if desired. It may further be possible to arrange the fastening device 1 with more than two lever arms if desired.

It will be appreciated that the above description is merely exemplary in nature and is not intended to limit the present disclosure, its application or uses. While specific examples have been described in the specification and illustrated in the drawings, it will be understood by those of ordinary skill in the art that various changes may be made and equivalents may be substituted for elements thereof without departing from the scope of the present disclosure as defined in the claims. Furthermore, modifications may be made to adapt a particular situation or material to the teachings of the present disclosure without departing from the essential scope thereof. Therefore, it is intended that the present disclosure not be limited to the particular examples illustrated by the drawings and described in the specification as the best mode presently contemplated for carrying out the teachings of the present disclosure, but that the scope of the present disclosure will include any embodiments falling within the foregoing description and the appended claims. Reference signs mentioned in the claims should not be seen as limiting the extent of the matter protected by the claims, and their sole function is to make claims easier to understand.

REFERENCE SIGNS

1 Fastening device
2 Socket
3 Engagement structure
3a Hole, Engagement structure
3b Outer side, Engagement structure
4a First lever arm
4b Second lever arm
5a First pivot point
5b Second pivot point
6a First attachment surface
6b Second attachment surface
7a First arm section
7b Second arm section
7c Third arm section
7d Fourth arm section
8a First arm end
8b Second arm end
8c Third arm end
8d Fourth arm end
9 Support structure
10 Support surface
11 Extension structure
12 Slot
12a Groove
13 Locking device
14 Locking slot
15 Locking pin
16 Locking channel
17 Spring
18a First axle
18b Second axle
19 Pin
100 Object
101 Opening
102a First side, Object
102b Second side, Object
103a First engagement surface, Object
103b Second engagement surface, Object

What is claimed is:

1. A releasable fastening device, comprising a socket, an engagement structure, a first lever arm, and a second lever arm, wherein the socket is configured for being inserted into an opening of an object from a first side of the object, wherein the first lever arm is pivotably attached to the socket in a first pivot point and the second lever arm is pivotably attached to the socket in a second pivot point, wherein the first lever arm is slidably connected to the engagement structure and the second lever arm is slidably connected to the engagement structure, wherein the fastening device is configured for being movable between a mounting position in which the fastening device is insertable into the object and a fastening position in which the fastening device is attached to the object, wherein the first lever arm comprises a first attachment surface and the second lever arm comprises a second attachment surface, wherein the first attachment surface is configured for engaging a first engagement surface arranged on a second side of the object in connection to the opening in the fastening position, and wherein the second attachment surface is configured for engaging a second engagement surface arranged on the second side of the object in connection to the opening in the fastening position.

2. The releasable fastening device according to claim 1, wherein the fastening device comprises a first axle connected to the socket and the first lever arm, and a second axle connected to the socket and the second lever arm; wherein the first lever arm is pivotably arranged around the first axle in the first pivot point; and wherein the second lever arm is pivotably arranged around the second axle in the second pivot point.

3. The releasable fastening device according to claim 1, wherein the first lever arm comprises a first arm section extending between the first pivot point and a first arm end, wherein the first arm end is slidably connected to the engagement structure; and wherein the second lever arm comprises a second arm section extending between the second pivot point and a second arm end, wherein the second arm end is slidably connected to the engagement structure.

4. The releasable fastening device according to claim 1, wherein the first lever arm comprises a third arm section extending between the first pivot point and a third arm end, wherein the first attachment surface is arranged in connection to the third arm end; and wherein the second lever arm comprises a fourth arm section extending between the second pivot point and a fourth arm end, wherein the second attachment surface is arranged in connection to the fourth arm end.

5. The releasable fastening device according to claim 3, wherein the first lever arm comprises a third arm section extending between the first pivot point and a third arm end, wherein the first attachment surface is arranged in connection to the third arm end; and wherein the second lever arm comprises a fourth arm section extending between the second pivot point and a fourth arm end, wherein the second attachment surface is arranged in connection to the fourth arm end, and wherein the first arm section and the third arm section are extending in different directions from the first pivot point, and wherein the second arm section and the fourth arm section are extending in different directions from the second pivot point.

6. The releasable fastening device according to claim 3, wherein the first arm section and the second arm section are configured to be positioned in an X-like configuration in relation to each other in the fastening position.

7. The releasable fastening device according to claim 1, wherein the socket comprises a support structure with a support surface, wherein the support surface is configured for engaging the first side of the object.

8. The releasable fastening device according to claim 1, wherein the socket comprises an extension structure, wherein the extension structure is configured for protruding into the opening of the object.

9. The releasable fastening device according to claim 1, wherein the engagement structure comprises one or more slots, wherein the first arm end and the second arm end are slidingly connected to the one or more slots.

10. The releasable fastening device according to claim 1, wherein the fastening device comprises a locking device configured for releasably locking the engagement structure to the socket in the fastening position.

11. The releasable fastening device according to claim 10, wherein the locking device comprises one or more locking slots arranged in the engagement structure and one or more locking pins arranged in the socket, wherein each locking pin is configured for being in locking engagement with a corresponding locking slot in the fastening position.

12. The releasable fastening device according to claim 11, wherein the locking device comprises one or more locking channels arranged in the socket, wherein each locking pin is slidably connected to a corresponding locking channel.

13. The releasable fastening device according to claim 12, wherein the locking device comprises one or more springs, wherein each locking pin is slidably connected to the corresponding locking channel via a corresponding spring.

14. The releasable fastening device according to claim 1, wherein the engagement structure is configured for moving in a direction towards the socket when the fastening device is displaced from the mounting position to the fastening position; and wherein the engagement structure is configured for moving in a direction away from the socket when the fastening device is displaced from the fastening position to the mounting position; wherein the first lever arm is configured for pivoting around the first pivot point when the fastening device is being displaced between the mounting position and the fastening position, and wherein the second lever arm is configured for pivoting around the second pivot point when the fastening device is being displaced between the mounting position and the fastening position.

15. The releasable fastening device according to claim 1, wherein the engagement structure is arranged as a hood, and wherein the engagement structure is configured for at least partly encompassing the socket in the fastening position.

16. A method for operating a releasable fastening device, wherein the fastening device comprising a socket, an engagement structure, a first lever arm, and a second lever arm, wherein the first lever arm is pivotably attached to the socket in a first pivot point and the second lever arm is pivotably attached to the socket in a second pivot point, wherein the first lever arm is slidably connected to the engagement structure and the second lever arm is slidably connected to the engagement structure, wherein the first lever arm comprises a first attachment surface and the second lever arm comprises a second attachment surface, wherein the fastening device is movable between a mounting position in which the fastening device is insertable to an opening of an object and a fastening position in which the fastening device is attached to the object;

wherein the method comprising the steps: inserting the socket into the opening from a first side of the object when the fastening device is arranged in the mounting position, displacing the fastening device from the mounting position to the fastening position, and during movement of the fastening device from the mounting position to the fastening position engaging a first engagement surface arranged on a second side of the object in connection to the opening with the first attachment surface and engaging a second engagement surface arranged on the second side of the object in connection to the opening with the second attachment surface;

or wherein the method comprises the steps: displacing the fastening device from the fastening position to the mounting position, wherein in the fastening position the first attachment surface is engaging a first engagement surface arranged on a second side of the object in connection to the opening and the second attachment surface is engaging a second engagement surface arranged on the second side of the object in connection to the opening, during movement of the fastening device from the fastening position to the mounting position disengaging the first attachment surface from the first engagement surface and disengaging the second attachment surface from the second engagement surface, and removing the socket from the opening from a first side of the object when the fastening device is arranged in the mounting position or when the fastening device is being displaced towards the mounting position.

* * * * *